(12) United States Patent
Hong et al.

(10) Patent No.: US 9,970,832 B2
(45) Date of Patent: May 15, 2018

(54) MANUFACTURING METHOD OF STRAIN SENSOR, STRAIN SENSOR AND MOTION SENSING APPARATUS USING THE STRAIN SENSOR

(71) Applicant: SNU R&DB FOUNDATION, Seoul (KR)

(72) Inventors: Yong Taek Hong, Seoul (KR); Tae Hoon Kim, Seoul (KR)

(73) Assignee: SNU R&DB FOUNDATION, Seoul (KR)

( * ) Notice: Subject to any disclaimer, the term of this patent is extended or adjusted under 35 U.S.C. 154(b) by 162 days.

(21) Appl. No.: 14/900,743

(22) PCT Filed: Apr. 22, 2014

(86) PCT No.: PCT/KR2014/003488
§ 371 (c)(1),
(2) Date: Dec. 22, 2015

(87) PCT Pub. No.: WO2014/208883
PCT Pub. Date: Dec. 31, 2014

(65) Prior Publication Data
US 2016/0377493 A1 Dec. 29, 2016

(30) Foreign Application Priority Data
Jun. 24, 2013 (KR) .................. 10-2013-0072184

(51) Int. Cl.
*G01L 1/00* (2006.01)
*G01L 7/08* (2006.01)
(Continued)

(52) U.S. Cl.
CPC ............... *G01L 1/205* (2013.01); *G01B 7/16* (2013.01); *G01B 7/18* (2013.01); *G01L 1/2287* (2013.01); *G09B 19/0038* (2013.01)

(58) Field of Classification Search
None
See application file for complete search history.

(56) References Cited

U.S. PATENT DOCUMENTS 4,506,250 A    3/1985  Kirby
4,715,235 A *  12/1987 Fukui .................. D04B 1/14
                                                  338/114

(Continued)

FOREIGN PATENT DOCUMENTS

JP          04-012201 A    1/1992

OTHER PUBLICATIONS

International Search Report for PCT/KR2014/003488 dated Jul. 18, 2014 from Korean Intellectual Property Office.

*Primary Examiner* — Peter Macchiarolo
*Assistant Examiner* — Jermaine Jenkins
(74) *Attorney, Agent, or Firm* — Paratus Law Group, PLLC

(57) ABSTRACT

A strain sensor according to the present disclosure includes a flexible substrate, a rigid pattern on a side of the flexible substrate, and a conductive flexible pattern extending in a first direction on a side of the flexible substrate, in which the conductive flexible pattern overlaps the rigid pattern such that as the flexible substrate is compressed or stretched, the conductive flexible pattern is compressed or stretched, thereby changing electric resistance.

18 Claims, 12 Drawing Sheets

(51) Int. Cl.
*G01L 9/00* (2006.01)
*G01L 9/02* (2006.01)
*G01L 1/20* (2006.01)
*G01B 7/16* (2006.01)
*G01L 1/22* (2006.01)
*G09B 19/00* (2006.01)

(56) References Cited

U.S. PATENT DOCUMENTS

| | | | | |
|---|---|---|---|---|
| 5,097,252 | A * | 3/1992 | Harvill | A61B 5/1126 200/DIG. 2 |
| 5,216,193 | A * | 6/1993 | Masubuchi | G10H 1/0558 338/99 |
| 6,701,296 | B1 * | 3/2004 | Kramer | A61B 5/6806 370/545 |
| 6,809,462 | B2 * | 10/2004 | Pelrine | A63H 3/365 310/319 |
| 6,886,410 | B1 * | 5/2005 | Wang | G01L 9/0072 73/718 |
| 6,901,807 | B1 * | 6/2005 | Wang | G01L 9/0072 73/718 |
| 7,278,324 | B2 | 10/2007 | Smits et al. | |
| 9,625,330 | B2 * | 4/2017 | Park | G01L 1/205 |
| 2010/0154556 | A1 | 6/2010 | Yin | |
| 2012/0266685 | A1 | 10/2012 | Choi et al. | |
| 2014/0238153 | A1 * | 8/2014 | Wood | G06F 3/011 73/862.627 |

* cited by examiner

MANUFACTURING METHOD OF STRAIN SENSOR, STRAIN SENSOR AND MOTION SENSING APPARATUS USING THE STRAIN SENSOR

CROSS REFERENCE TO PRIOR APPLICATION

This application is a National Stage Patent Application of PCT International Patent Application No. PCT/KR2014/003488 (filed on Apr. 22, 2014) under 35 U.S.C. § 371, which claims priority to Korean Patent Application No. 10-2013-0072184 (filed on Jun. 24, 2013), which are all hereby incorporated by reference in their entirety.

TECHNICAL FIELD

The present disclosure relates to a method of manufacturing a strain sensor, a strain sensor, and a motion sensing device using the strain sensor.

BACKGROUND ART

A strain sensor, a sensor that senses physical changes such as tension, bending, or buckling applied to a sensor, is available for various industrial fields using the feature of sensing physical changes. Such a strain sensor could be implemented to a smart sportswear that can check the degree of relaxation and contraction of joints and muscles and the amount of exercise when a wearer takes exercise, a motion sensor that senses changes in motion of fingers and toes, and so on. Further, the strain sensor can be used in various fields from a micro-strain gauge that find out fine crack or fatigue in facilities, to a large-area strain sensor array.

DISCLOSURE

Technical Problem

As a strain sensor in the related art, there is a sensor using a thin metal film, and the sensor can sense deformation by measuring a resistance change generated by a physical change of metal film. The strain sensor using a thin metal film has difficulty in implenting to a motion detector, because it has low sensitivity and scalability is limited due to its nature. Further, the strain sensor of the related art has a large sensing error occurred by a deformation speed.

The present disclosure has been made in an effort to solve the problems in the related art and one of objects of the present disclosure is to provide a method of manufacturing a strain sensor that can measure deformation of an organism or an object with high sensitivity, a strain sensor according to the method, and a motion sensing device using the strain sensor. Another object of the present disclosure is to provide a method of manufacturing a strain sensor, which can be manufactured through a simple manufacturing process, a strain sensor, and a motion sensing device using the strain sensor, and another object of the present disclosure is to provide a method of manufacturing a strain sensor that can easily ensure a large area, a strain sensor, and a motion sensing device using the strain sensor.

Technical Solution

A strain sensor according to an aspect of the present disclosure includes a flexible substrate, a rigid pattern on a side of the flexible substrate, and a conductive flexible pattern extending in a first direction on a side of the flexible substrate, in which the conductive flexible pattern overlaps the rigid pattern such that as the flexible substrate is compressed or stretched, the conductive flexible pattern is compressed or stretched, thereby changing electric resistance.

A method of manufacturing a strain sensor according to another aspect of the present disclosure includes: preparing a flexible substrate; forming a first pattern on a side of the flexible substrate; forming a rigid pattern by hardening the first pattern; and forming a conductive flexible pattern, in which the forming of a rigid pattern and the forming of a conductive flexible pattern are performed by printing.

A motion sensing device according to another aspect of the present disclosure is equipped with a strain sensor that includes a flexible substrate, a rigid pattern on a side of the flexible substrate, and a conductive flexible pattern extending in a first direction on a side of the flexible substrate, in which the conductive flexible pattern overlaps the rigid pattern such that as the flexible substrate is compressed or stretched, the conductive flexible pattern is compressed or stretched, thereby changing electric resistance.

Advantageous Effects

According to the present disclosure, an effect according to a change of an electrical resistance due to cracks in a conductive flexible line generated by stretching and contracting of a flexible substrate, so it is possible to measure deformation of an organism or an object. Further, a change of a measurement result occurred by speeds of stretching and contracting is smaller than that in the related art, so it is possible to detect deformation of an object with high reliability.

According to the method of manufacturing a strain sensor, it is possible to manufacture a product using a printing process, so it is possible to manufacture a product using a simple process and to easily scale up a sensor which can sense more spacious region

Figure 1:
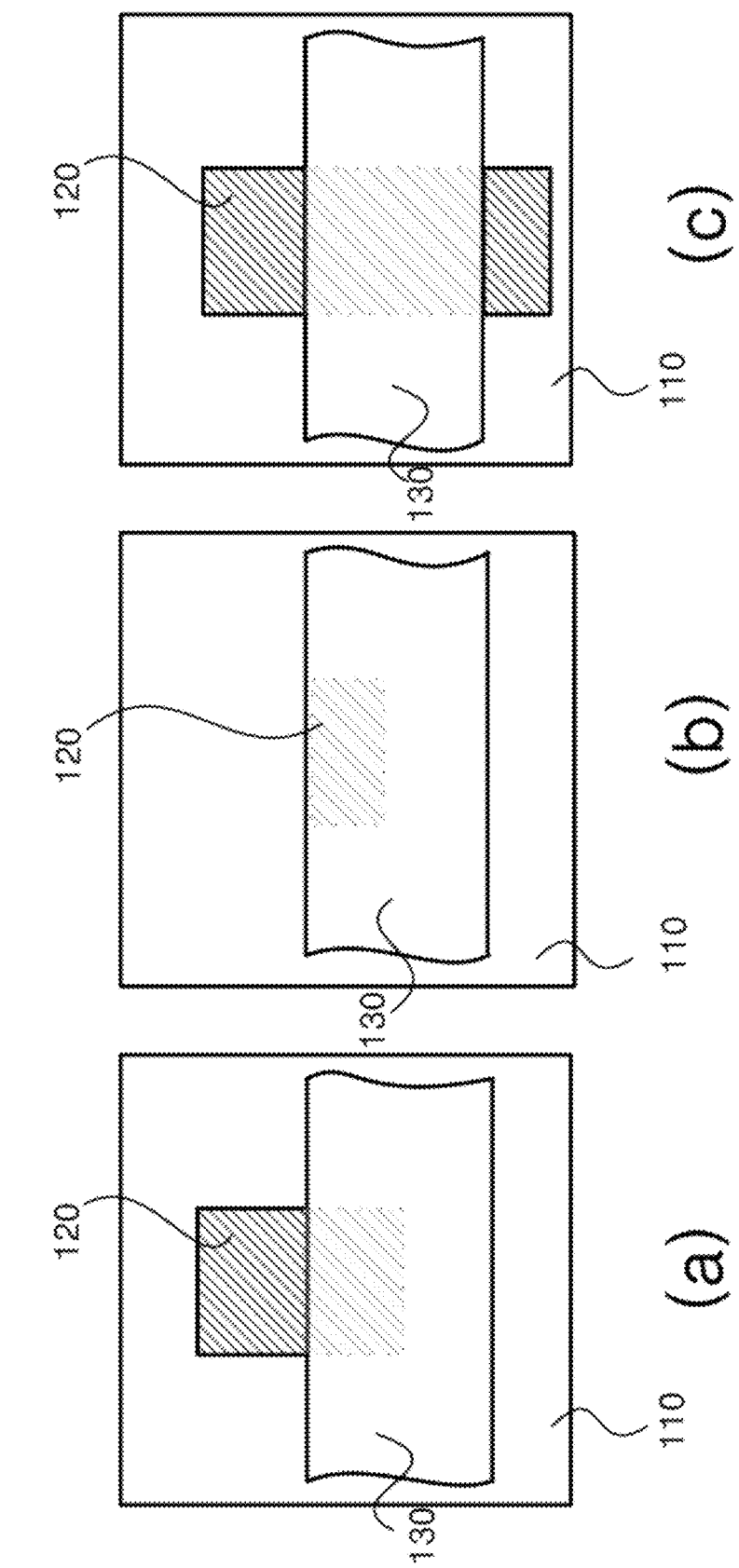
FIG. 1 is a view schematically illustrating a strain sensor according to an embodiment of the present disclosure.

| [Description of Main Reference Numerals of Drawings] | |
|---|---|
| 100: Strain sensor | 110: Flexible substrate |
| 120: Rigid pattern | 130: Conductive flexible line |

BEST MODE

The description of the disclosed technology is just an example for structural and functional illustration, and thus the scope of the disclosure should not be interpreted as being limited by the example. That is, since the present disclosure may be variously modified and have several exemplary embodiments, the scope of the disclosure should be understood as including equivalents by which the spirit of the disclosure can be achieved.

The terms used herein should be understood as follows.

Singular forms are intended to include plural forms unless the context clearly indicates otherwise. It will be further understood that the terms "comprises" or "have" as used in this specification specify the presence of stated features, steps, operations, components, parts, or a combination thereof, but do not preclude the presence or addition of one or more other features, numerals, steps, operations, components, parts, or a combination thereof.

The steps happen in different ways from the order described herein unless the context clearly indicates the order otherwise. That is, the steps may be generated in the order described and substantially simultaneously, but they may be performed in reverse direction.

Unless indicated otherwise, it is to be understood that all the terms used in the specification including technical and scientific terms have the same meaning as those as understood by those who are skilled in the art. It should be understood that the terms defined by a dictionary must be identical with the meanings within the context of the related art, and they should not be ideally or excessively formally defined unless the context clearly dictates otherwise.

It should be understood that sizes, thicknesses, and lengths may be exaggerated to clearly describe embodiments illustrated in the drawings.

A strain sensor according to an embodiment of the present disclosure is described hereafter with reference to the accompanying drawings. FIG. 1 is a view schematically illustrating a strain sensor according to an embodiment of the present disclosure. A strain sensor includes a flexible substrate, a rigid pattern on a side of the flexible substrate, and a conductive flexible pattern extending in a first direction on a side of the flexible substrate, in which the conductive flexible pattern overlaps the rigid pattern such that as the flexible substrate is compressed or stretched, the conductive flexible pattern is compressed or stretched, thereby changing its electrical resistance.

The flexible substrate 110 has elasticity, so it is deformed by a compressive force or a tensile force applied from the outside. For example, the flexible substrate 100 is compressed/stretched in the first direction, in which the conductive flexible pattern 130 extends. As an example, the flexible substrate 110 may be a substrate including rubber, PDMS, poly-urethane, a stretchable fiber, ecoflex, and a common stretchable tape.

The conductive flexible pattern 130 and the rigid pattern 120 are both formed by printing a printable conductive material. For example, the printable conductive material may include at least any one or more of carbon nanotube (CNT), carbon black, PEDOT:PSS, and conductive nano ink using zinc oxide (ZnO) or silver (Ag). The rigid pattern 120 has undergone hardening, which is described below, so it is larger in hardness than the conductive flexible pattern 130. The rigid pattern 120 at least partially overlaps the conductive flexible pattern 130. The rigid pattern 120 partially overlaps the conductive flexible pattern 130 in FIG. 1A, while the rigid pattern fully overlaps the conductive flexible pattern 130 in FIG. 1B. In FIG. 1C, the rigid pattern 120 and the conductive flexible pattern 130 cross each other at a predetermined angle.

Figure 2:
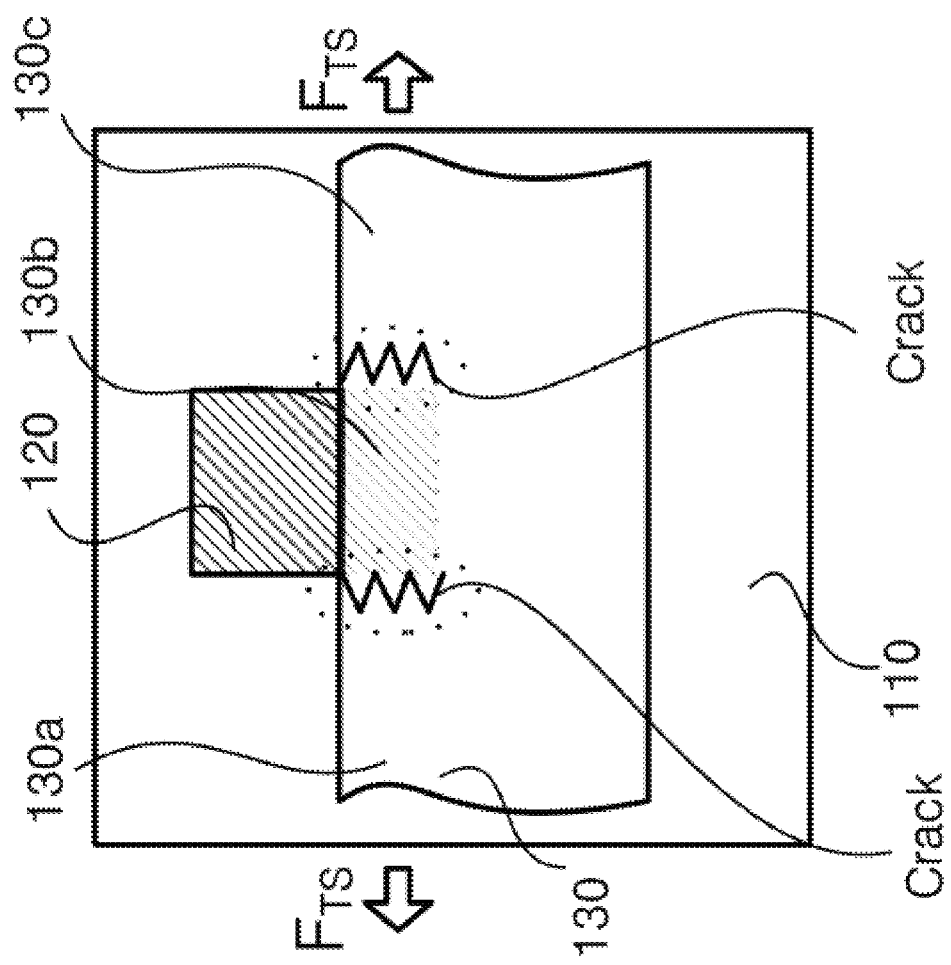
FIG. 2 is a view schematically illustrating a case when tensile forces FTs are applied opposite to each other in a first direction to the strain sensor according to an embodiment of the present disclosure.

FIG. 2 is a view schematically illustrating a case when tensile forces FTS are applied to a first and opposite directions with each other to the strain sensor according to an embodiment of the present disclosure. A tensile force FTs applied in this process is large enough to form cracks in a conductive flexible line, but is not enough to separate parts 130a, 130b, and 130c of the conductive flexible line. Referring to FIG. 2, when tensile forces are applied opposite to each other in the extension direction of the conductive flexible line, the flexible substrate 110 stretches in the tension force direction. Because the conductive flexible pattern 130 on the flexible substrate also has elasticity, it stretches in the stretch direction of the flexible substrate. However, the rigid pattern 120 has been hardened, and more firmly bonded to the flexible substrate 110 through hardening, so the degree of stretch of the rigid pattern is smaller than that of the flexible substrate 110 or the conductive flexible pattern 130, even if a tensile force is applied.

When a tensile force is applied, the conductive flexible line 130 on the flexible substrate 110 stretches with the flexible substrate, but the stretching amount of the conductive flexible line on the rigid pattern 120 is approximately the same with the stretching amount of the rigid pattern, which is less than those of the conductive flexible line 130 and flexible substrate 110. Accordingly, when a tensile force is applied, cracks are generated along the boundaries of the portion, which overlaps the rigid pattern 120, in the conductive flexible line 130 and reduces the contact area between the conductive flexible line parts 130a and 130c and the conductive flexible line part 130b on the rigid pattern, so electrical resistance of the conductive flexible line increases.

Figure 3:
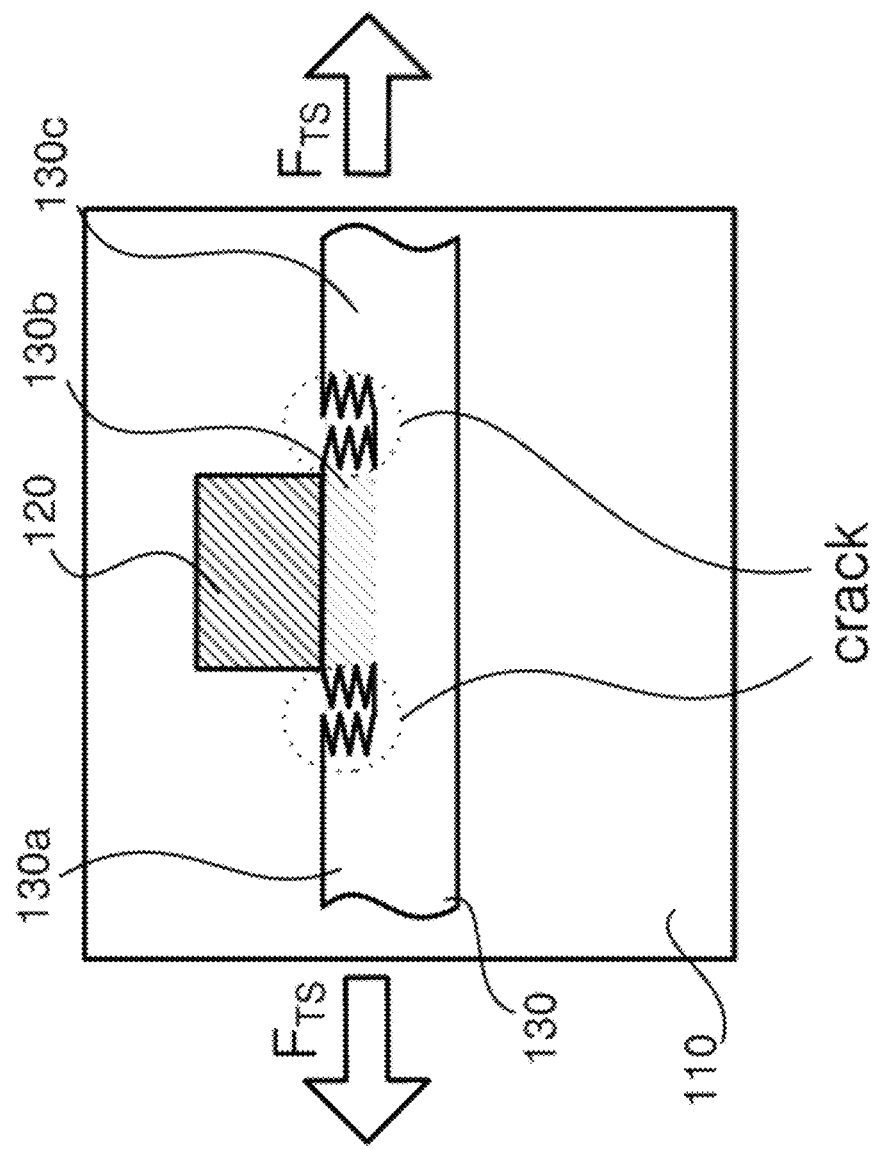
FIG. 3 is a view schematically illustrating a case when a large tensile force that is large enough to separate conductive flexible line parts 130a, 130b, and 130c is applied.

FIG. 3 is a view schematically illustrating a case when a tensile force that is large enough to separate the conductive flexible line parts 130a, 130b, and 130c is applied. When the conductive flexible line is stretched by a tensile force larger than the tensile force applied in FIG. 2, the conductive flexible line 130 increases in length and a conductive path further decreases in width, so electrical resistance increases.

Further, since the larger tensile force is applied, the larger cracks are generated by the tensile force. That is, the conductive flexible line parts 130a and 130c on the flexible substrate 110 and the conductive flexible line part 130b on the rigid pattern are spaced from each other, so the electrical contact area between the conductive flexible line parts 130a and 130c on the flexible substrate 110 and the conductive flexible line part 130b on the rigid pattern 120 further decreases. Accordingly, the conductive path width of the conductive flexible line more decreases, the electrical resistance more increases.

However, when the applied tensile force reduces, the flexible substrate relaxes and returns to the initial state by elasticity. Accordingly, as the flexible substrate relaxes, the conductive flexible line patterns 130a and 130c that has been stretched returns to the initial width and length, and the conductive flexible line part 130b on the rigid pattern 120 and the conductive flexible line parts 130a and 130c are bonded back to each other, thereby forming a conductive path reversibly. Therefore, the conductive flexible line has electrical resistance lower than the electrical resistance measured when a tensile force is applied.

If a signal source is applied to an end of the conductive flexible line 130 and a read-out circuit is electrically connected to the other end, it is possible to sense the flexible substrate stretched and compressed by detecting a change in electrical resistance due to the stretch and compression of the flexible substrate.

Figure 4:
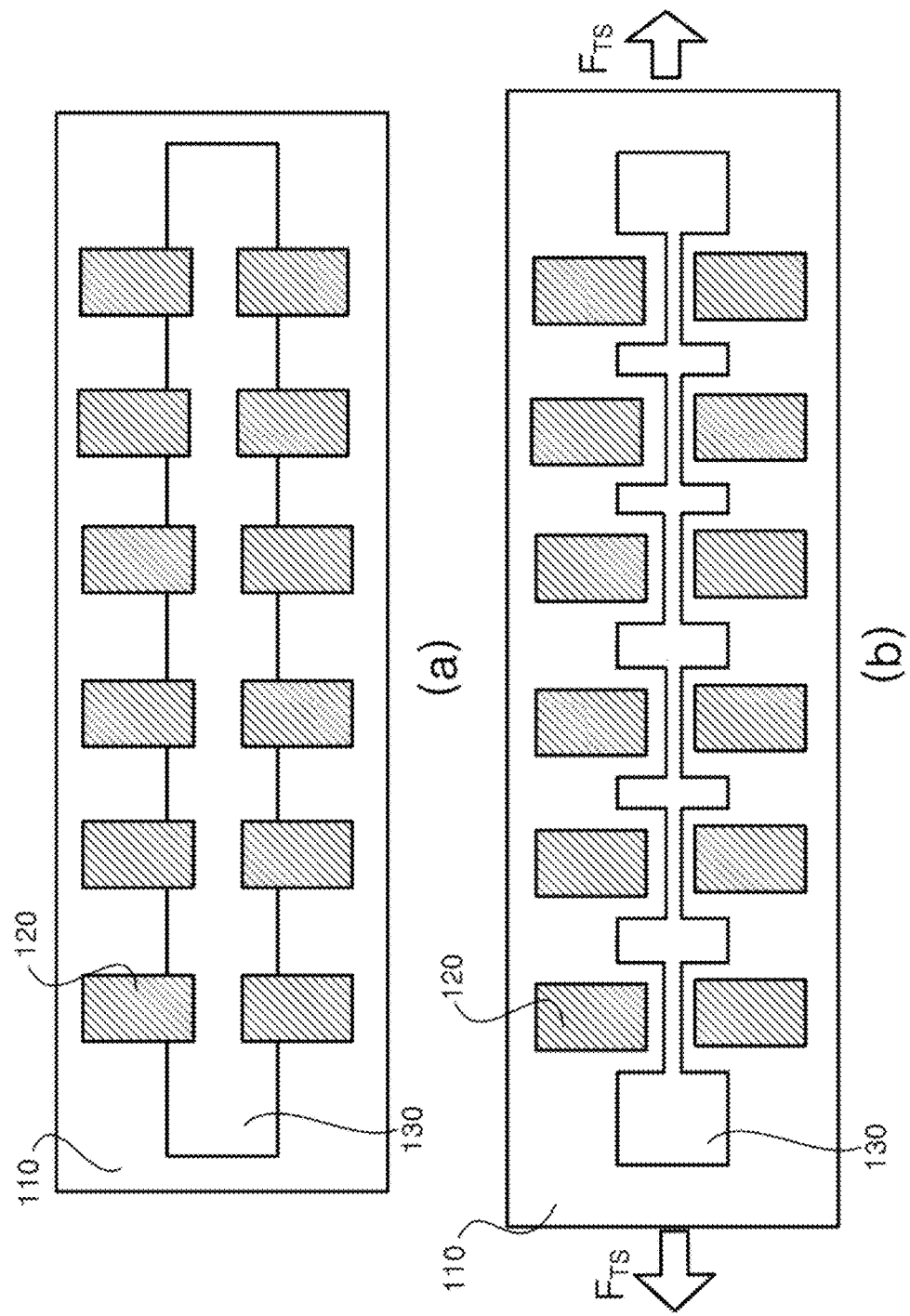
FIGS. 4 and 5 are views schematically illustrating another embodiment of a strain sensor.
Figure 5:
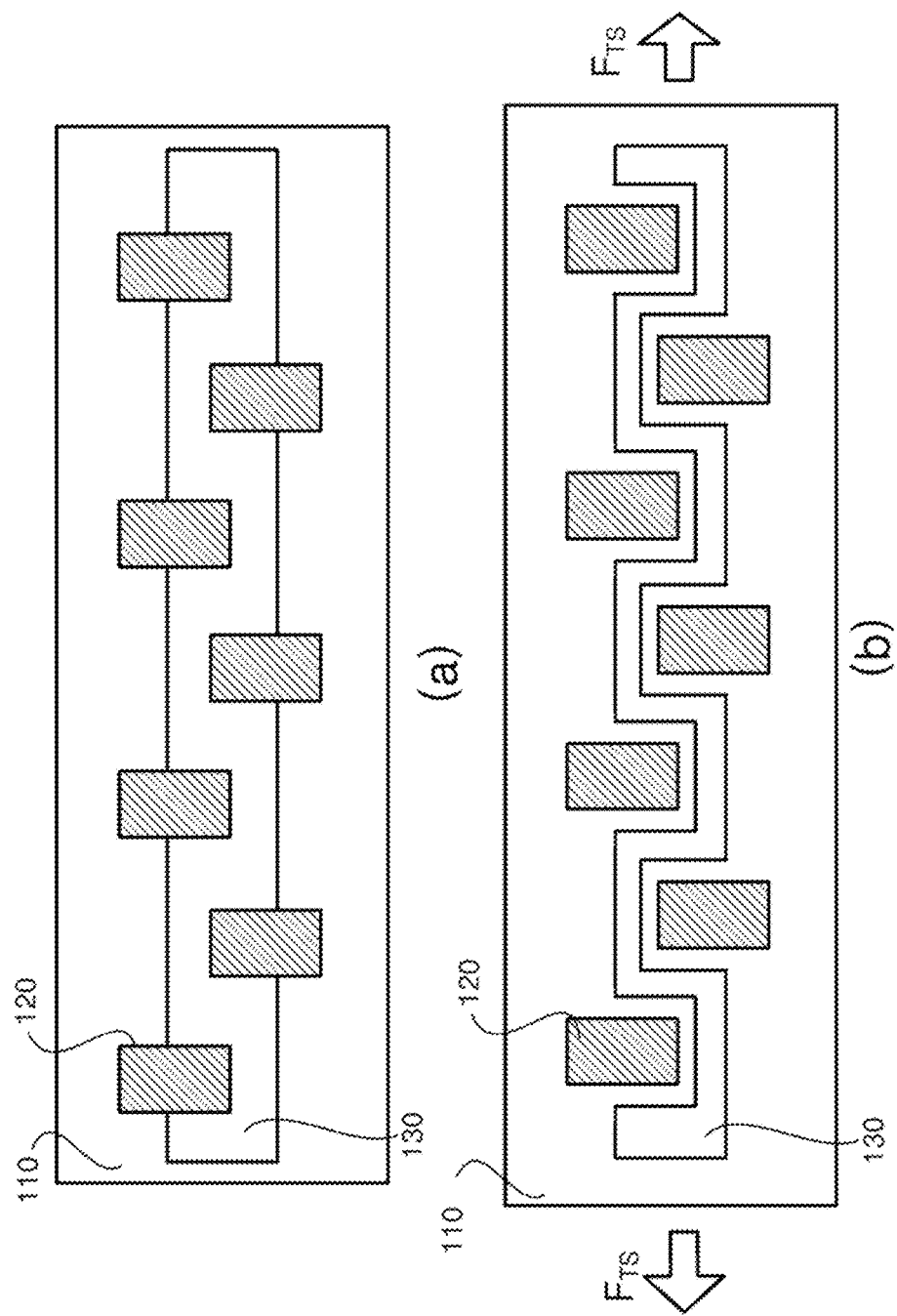

FIGS. 4 and 5 are views schematically illustrating another embodiment of a strain sensor. Referring to FIG. 4A, a conductive flexible line 130 extends in one predetermined direction and a plurality of rigid patterns 120 is arranged in a first direction symmetrically to each other with the conductive flexible pattern 130 therebetween. The plurality of rigid patterns 120 partially overlap the conductive flexible line 130. As in FIG. 4B, when tensile forces are applied opposite to each other in the extension direction of the conductive flexible line, cracks are not formed in the conductive flexible line between the rigid patterns, but are formed at the portions where the rigid patterns face each other in the conductive flexible line 130, so the conductive path reduces in width and electrical resistance increases.

Referring to FIG. 5A, a conductive flexible line 130 extends in one predetermined direction and a plurality of rigid patterns 120 is arranged alternately in a first direction with the conductive flexible pattern therebetween. The plurality of rigid patterns 120 partially overlap the conductive flexible line 130, as in FIG. 5B, so when tensile forces are applied opposite to each other in the extension direction of the conductive flexible line, the conductive flexible line 130 is deformed in a zigzag shape due to the crack, as illustrated in the figure. Accordingly, the conductive path increases in length and decreases in width in comparison to the width before the tensile forces are applied. Accordingly, when a tensile force is applied, the electrical resistance of the conductive flexile line 130 increases.

It should be understood that those skilled in the art can adjust the difference in electrical resistance when a tensile force is applied and not applied, by adjusting the arrangement of the rigid patterns and the width of the rigid patterns.

Figure 6:
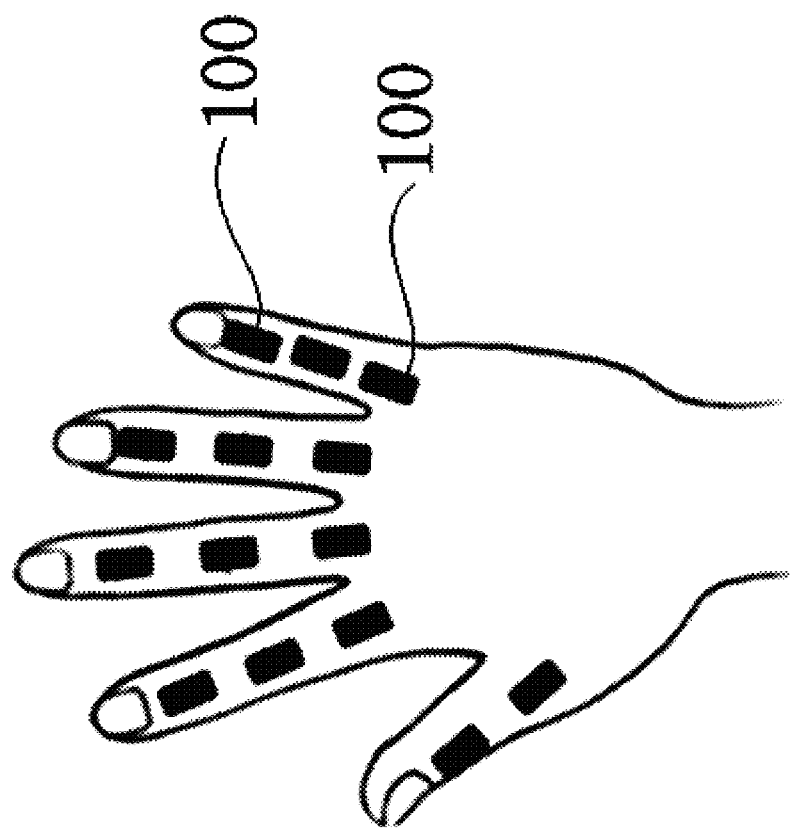
FIG. 6 is a view illustrating a case when motion sensing devices 100 according to an embodiment of the present disclosure are mounted on the skins at joints of human fingers.

Next, a motion sensing device according to an embodiment is described. FIG. 6 is a view illustrating a case when motion sensing devices 100 according to an embodiment of the present disclosure are mounted on the skins at joints of human fingers. The motion sensing devices 100 include the strain sensor according to the embodiment described above, so when a user bend fingers, a tensile force is generated in the flexible substrates attached to the skins of the joints of the fingers. Accordingly, electrical resistance in the conductive flexible line changes, as described in the previous embodiment. Further, the motion sensing device according to this embodiment may include a strain sensor on the opposite side of the joints of the fingers, so every time the joints are moved, a tensile force is applied to any one of the strain sensors and a compressive force is applied to the other strain sensor, and thus, they are complementarily operated. Accordingly, it is possible to sense motion with higher precision and sensitivity.

Although finger joints were exemplified in this embodiment, this is for easy description and the motion sensing device may be mounted on any joints of a human body such as a shoulder, a knee, an elbow, a wrist, and an ankle. Further, the motion sensing device may be mounted in the shape of a glove to check motion of finger joints and sense the motion, and it may be mounted on large joints in the shape of a band to check motion of the joints such as the joints of knees and sense the motion.

Although it was exemplified above that the motion sensing device is simply mounted on the skin of joints or in the shape of a glove or a band, the motion sensing device may inserted in an artificial joint to detect motion and stress in the artificial joint.

Figure 7:
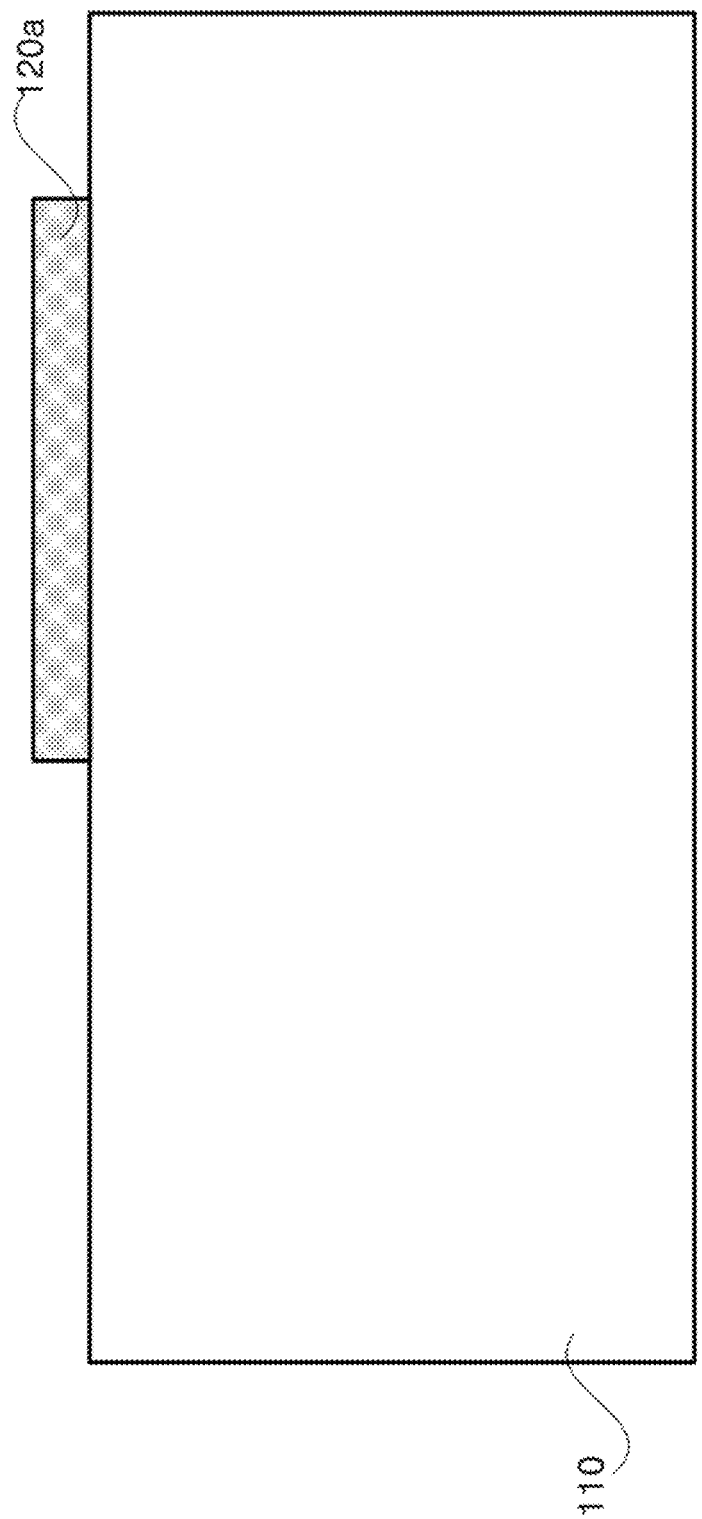
FIGS. 7 to 10 are cross-sectional views illustrating processes of a method of manufacturing a strain sensor according to an embodiment of the present disclosure.
Figure 8:
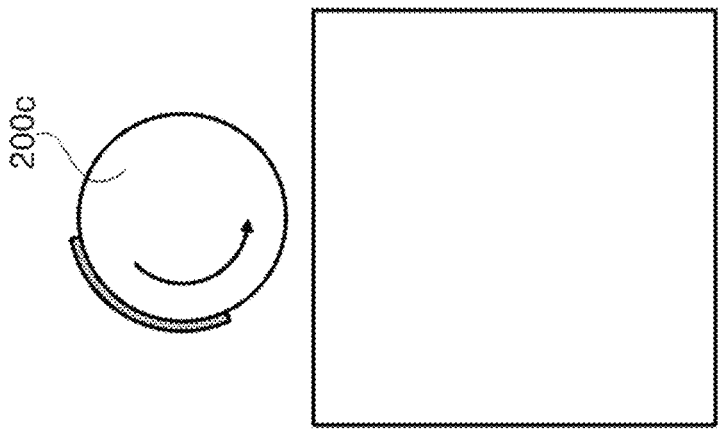
Figure 8:
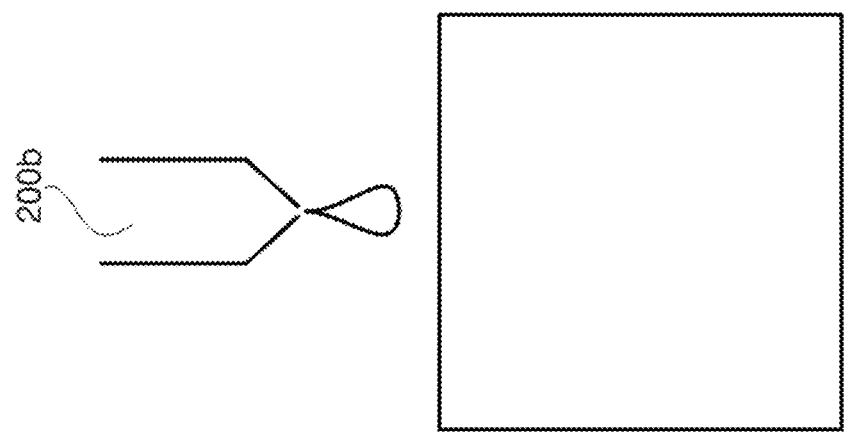
Figure 8:
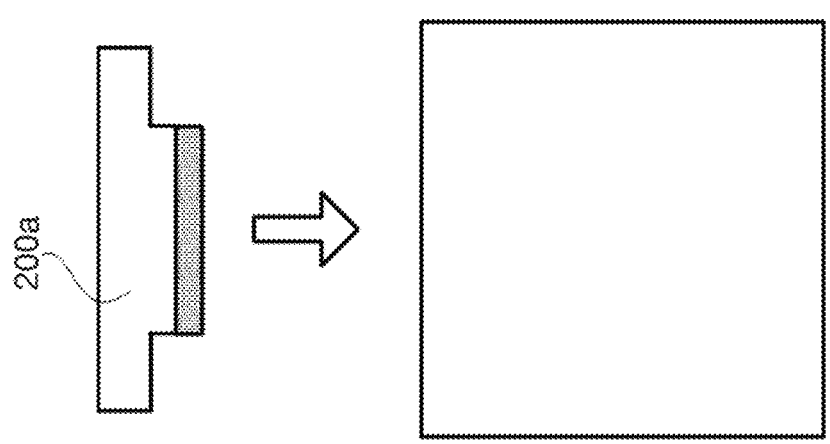

Hereinafter, a method of manufacturing a strain sensor according to an embodiment of the present disclosure is described with reference to FIGS. 7 to 10. FIGS. 7 to 10 are cross-sectional views illustrating processes of a method of manufacturing a strain sensor according to an embodiment of the present disclosure. Referring to FIG. 7, a flexible substrate 110 is prepared and a first pattern is formed on a side of the flexible substrate. The first pattern 120a is formed by printing a printable conductive material. For example, the flexible substrate may be a PDMS substrate and may be made of a flexible material such as rubber, poly-urethane, a stretchable fiber, ecoflex, and a common stretchable tape.

The printable conductive material may include a carbon-based material such as carbon nano tube (CNT) and carbon black, and a conductive polymer, in which the conductive polymer may be PEDOT:PSS. Alternatively, the printable conductive material may be conductive nano ink using zinc oxide or silver. For example, a printable conductive material may be produced by mixing deionized water, a surfactant, and a carbon nano tube at a predetermined ratio, and performing ultrasonic mixing, centrifugation, and then filtering on the mixture. The printable conductive material forms a first pattern 120a by being printed with a predetermined solution.

Printing is performed by transfer printing that puts a material for the first pattern on a mold 200a and then transcribes it, as illustrated in FIG. 8a. Alternatively, the first pattern is formed by inkjet printing that sprays a printable conductive material through a nozzle 200b. Alternatively, as illustrated in FIG. 7C, the first pattern is formed by roll-to-roll printing that puts a printable conductive material on a roller 200c and then prints it. The surface of the flexible substrate 110 has hydrophobicity, so when the first pattern is printed with a solution including a conductive material, the pattern does not spreads, but gathers on the surface.

Figure 9:
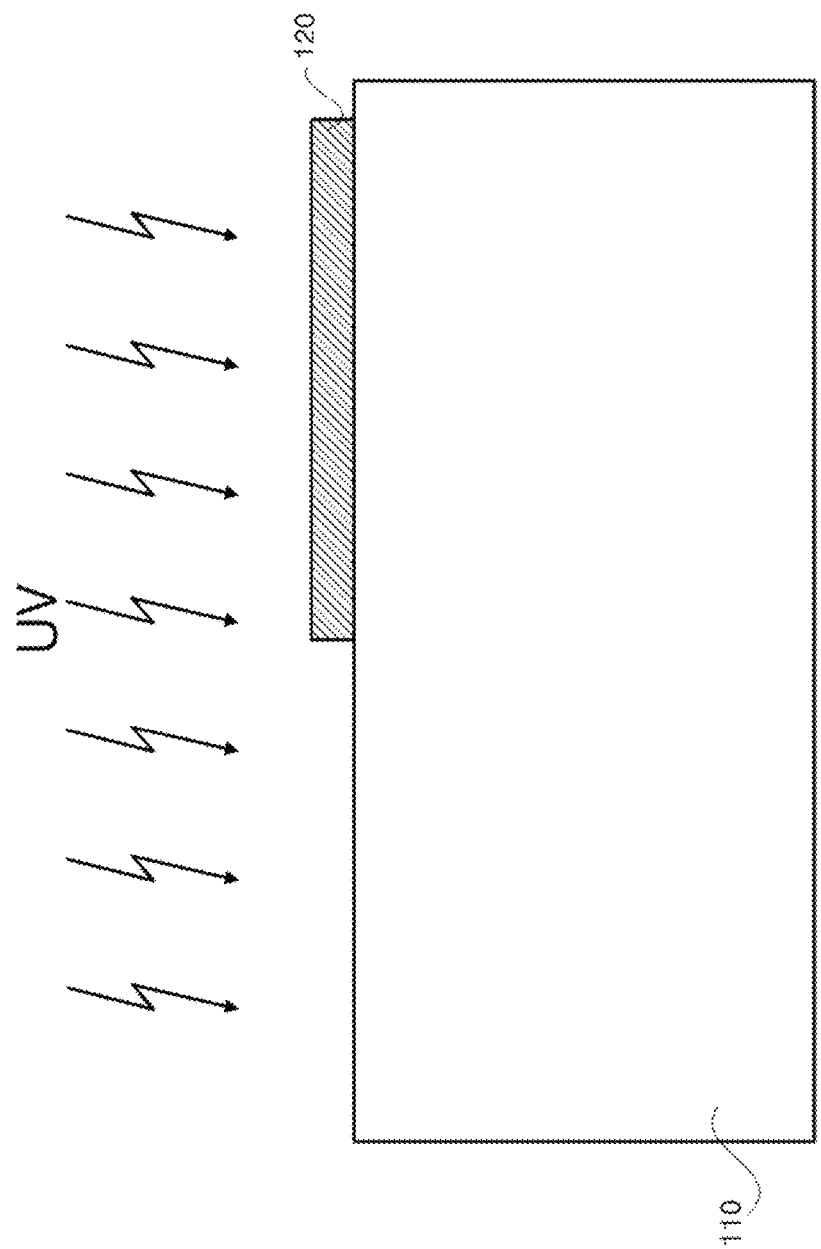

FIG. 9 is a view illustrating a process of forming a rigid pattern 120 by hardening a first pattern. Referring to FIG. 9, ultraviolet rays are radiated to the first pattern 120a (see FIG. 8) that has been printed. The first pattern is formed in to the rigid pattern 120 by being hardened by ultraviolet rays and is further bonded to the flexible substrate 110 in the process of hardening. Further, the surface of the flexible substrate becomes hydrophilic by the ultraviolet rays. Hardening for forming the rigid pattern may be achieved by not only the ultraviolet treatment, but thermal treatment, laser radiation, and chemical treatment.

Figure 10:
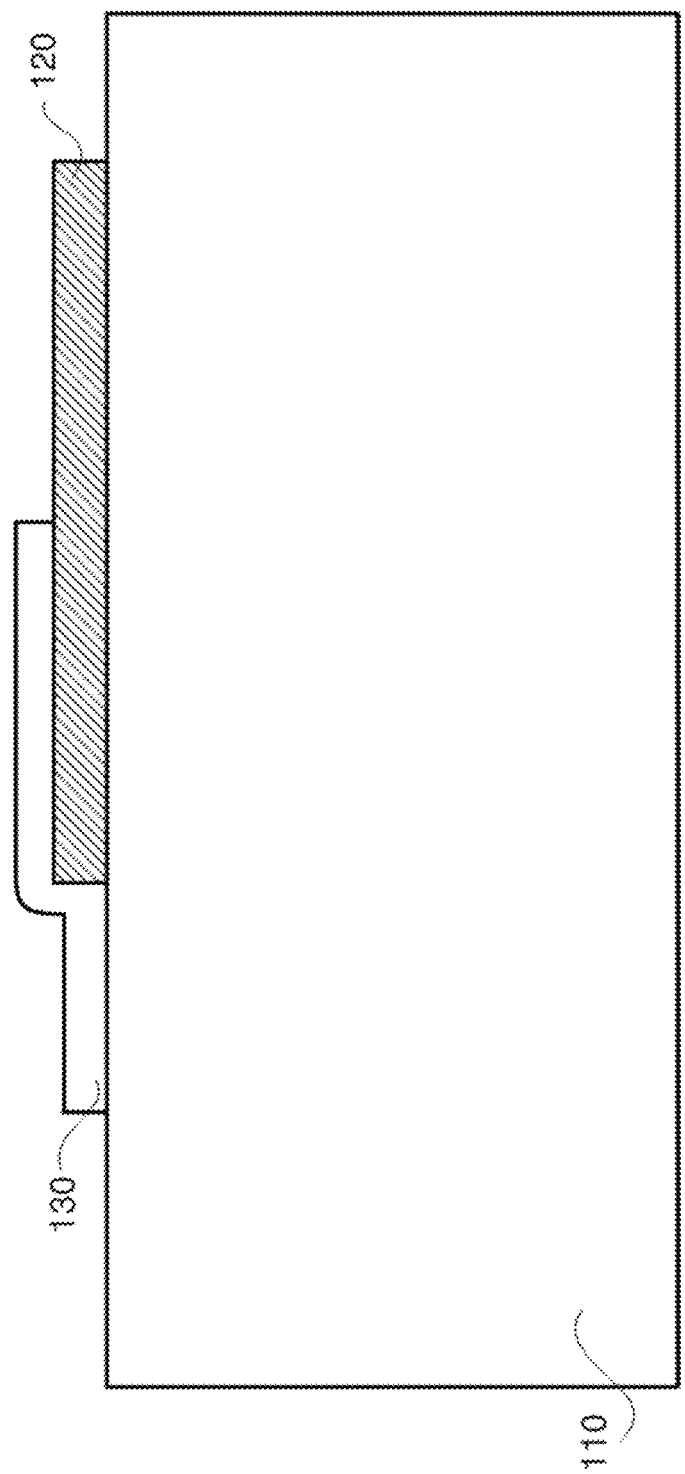

FIG. 10 is a view illustrating a process of a conductive flexible line on the rigid pattern 120. Referring to FIG. 10, the conductive flexible line 130 is formed by printing a printable conductive material. For example, the flexible substrate 110 may be a PDMS substrate and may be made of a flexible material such as rubber, PDMS, poly-urethane, a stretchable fiber, ecoflex, and a common stretchable tape. The printable conductive material may include a carbon-based material such as carbon nano tube (CNT) and carbon black, a conductive polymer, or conductive nano particle-based ink, in which the conductive polymer may be PEDOT:PSS. The conductive nano particle-based ink may be conductive nano particle-based ink using zinc oxide (Zn) or silver (Ag). Further, the conductive flexible line may be formed by printing, the same as the process of forming the first pattern. The conductive flexible line may be formed by transfer printing, inkjet printing, or roll-to-roll printing.

Further, hardening is not performed after the conductive flexible line is formed, so flexibility is achieved, as compared with the rigid patterns 120. The conductive flexible line formed after hardening, which is formed after the surface of the flexible substrate changes to be hydrophilic, spreads on the surface of the flexible substrate 110, unlike the first pattern.

EXPERIMENTAL EXAMPLE AND
COMPARATIVE EXAMPLE

Figure 11:
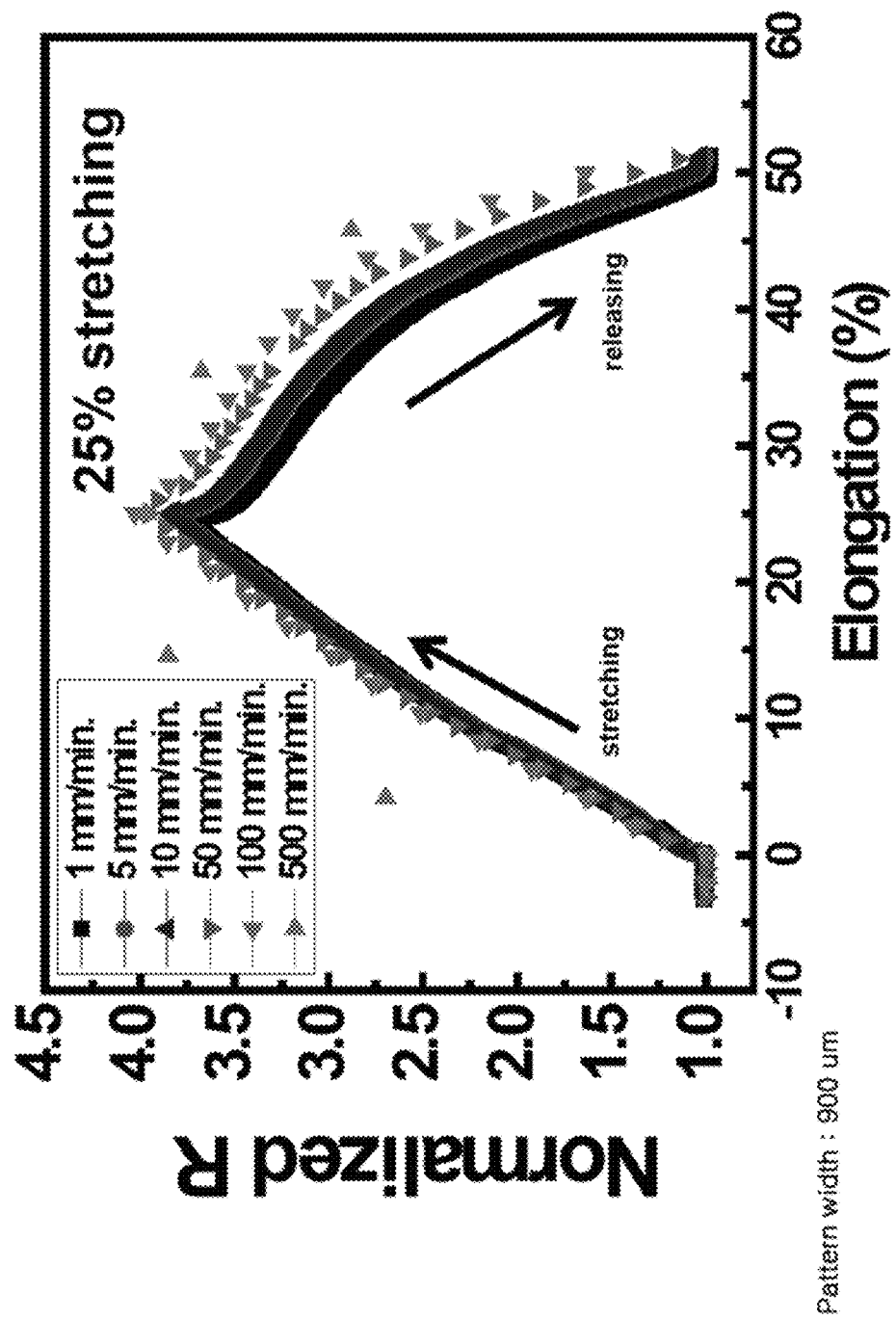
FIG. 11 is a view illustrating sensing characteristics of a strain sensor according to an embodiment of the present disclosure.

Hereinafter, an experimental example according to an embodiment of the present disclosure is described with reference to FIGS. 11 and 12. FIG. 11 is a view illustrating characteristics of a strain sensor according to an embodiment of the present disclosure. A strain sensor according to this embodiment was formed by inkjet-printing a printable conductive material, which is formed by dispersing a carbon nano tube and SDBS (Sodium Dodecyl Benzene Sulfonate) that is a surfactant in a DI water and then performing ultrasonic dispersion, centrifugation, and then filtering on the mixture, on a PDMS substrate. As illustrated in the figure, the size of rigid patterns in the conductive flexible line is 900 μm.

As illustrated in FIG. 11, when a resistance value was measured with a tensile force applied to achieve 25% stretch from a fully relaxed state, the resistance value was increased by 400% of the resistance value measured in the relaxed state. When the tensile force was removed to relax the strain sensor, the resistance value returned to the initial state. Further, when the strain sensor was stretched at the minimum stretching speed (1 mm per minute) and the maximum stretching speed (500 mm per minute), the measured resistance values were little different.

That is, the strain sensor according to the embodiment illustrates uniform response regardless of the stretching and contracting speeds that cause deformation, and the resistance changes by four times of the resistance value measured in the relaxed state when it is stretched by 25%, so stretching and relaxing can be detected with high sensitivity. Further, the change in resistance value was linear in stretching and contracting, so linearity is high.

Figure 12:
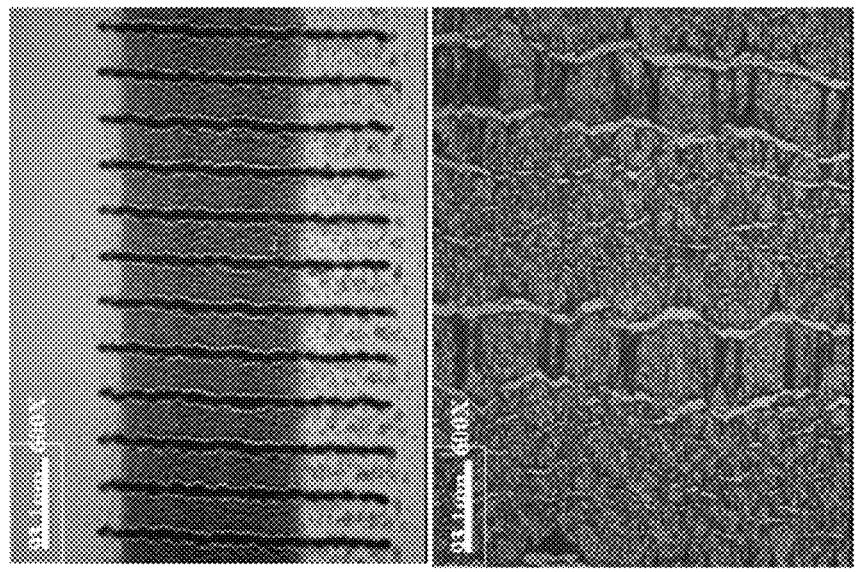
FIG. 12 illustrates microscopic pictures of a strain sensor according to an embodiment of the present disclosure and a strain sensor according to a comparative example.
Figure 12:
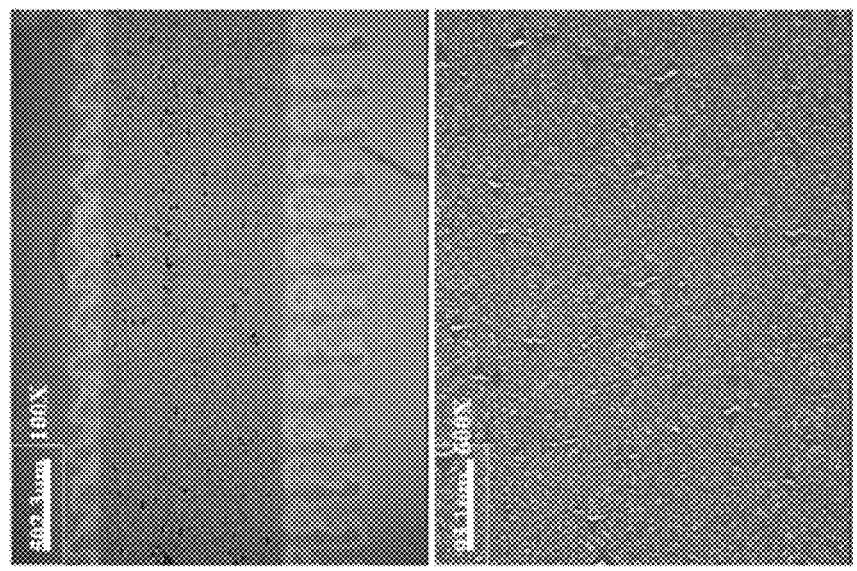

FIG. 12 illustrates microscopic pictures of a strain sensor according to an embodiment of the present disclosure and a strain sensor according to a comparative example. The upper one in FIG. 12A is a view illustrating a strain sensor according to an embodiment of the present disclosure and the lower one is an enlarged view illustrating the strain sensor according to an embodiment of the present disclosure which has been stretched by 50% due to a tensile force. Referring to the view at the lower portion in FIG. 12A, cracks formed in a conductive flexible line around rigid patterns 120 due to a stretching force are clearly illustrated, and it was described above that the electrical resistance at both ends of the conductive flexible line is increased by the cracks.

FIG. 12B is a picture of a strain sensor according to a comparative example. The comparative example illustrated at the upper portion in FIG. 12B was formed by forming a first pattern and a conductive flexible line from a printable conductive material on a flexible substrate and then performing hardening with ultraviolet rays. Referring to the lower portion in FIG. 12B that enlarges a view of the conductive flexible line stretched by applying a tensile force to the comparative example, it can be seen that cracks are uniformly distributed in the conductive line. That is, when a strain sensor is formed, as in the comparative example, it is impossible to control the position and the degree of cracks, so the electrical resistance of the embodiment cannot be expected even by applying a tensile force.

Although the present disclosure has been described in connection with the embodiments illustrated in the drawings in order to help understand the present disclosure, the embodiments are only examples and it should be understood that various changes and equivalent modifications can be implemented from the present disclosure by those skilled in the art. Therefore, the technical protection range of the present disclosure should be determined by the accompanying claims.

The invention claimed is:
1. A strain sensor comprising:
a flexible substrate;
a rigid pattern on one side of the flexible substrate; and
a conductive flexible pattern extending in a first direction on the one side of the flexible substrate,
wherein the conductive flexible pattern is configured to overlap the rigid pattern such that as the flexible substrate is compressed or stretched, the conductive flexible pattern is compressed or stretched, thereby changing electrical resistance,
wherein the flexible pattern is configured to form a crack thereon at a portion adjacent to the rigid pattern when the flexible pattern is stretched such that the electrical resistance of the conductive flexible pattern is changed by the crack formed on the flexible pattern.
2. The strain sensor of claim 1, wherein the flexible substrate includes any one of PDMS, rubber, PDMS, poly-urethane, a stretchable fiber, ecoflex, and a stretchable tape.
3. The strain sensor of claim 1, wherein the conductive flexible pattern is made of a printable conductive material.
4. The strain sensor of claim 3, wherein the printable conductive material includes at least any one of CNT, carbon black, and PEDOT.
5. The strain sensor of claim 1, wherein a plurality of the rigid patterns is formed in the first direction.
6. The strain sensor of claim 5, wherein the rigid patterns are arranged alternately with respect to the conductive flexible pattern extending in the first direction.
7. The strain sensor of claim 5, wherein the rigid patterns are arranged symmetrically to each other with respect to the conductive flexible pattern extending in the first direction.
8. The strain sensor of claim 1, wherein a hardness of the rigid pattern is bigger than a hardness of the conductive flexible pattern.
9. A method of manufacturing a strain sensor, comprising:
preparing a flexible substrate;
forming a first pattern on a side of the flexible substrate;
forming a rigid pattern by hardening the first pattern; and
forming a conductive flexible pattern on the side of the flexible substrate to have a first portion which is overlapped with and in direct contact with the rigid pattern, the flexible pattern configured to form a crack thereon at a second portion adjacent to the first portion when the flexible pattern is stretched,
wherein the forming of a rigid pattern and the forming of a conductive flexible pattern are performed by printing.
10. The method of claim 9, wherein the flexible substrate includes any one of PDMS, rubber, PDMS, poly-urethane, a stretchable fiber, ecoflex, and a common stretchable tape.

11. The method of claim 9, wherein the forming of a first pattern and the forming of a conductive flexible pattern is performed by using a printable conductive material.

12. The method of claim 11, wherein the printable conductive material includes at least any one of CNT, carbon black, and PEDOT.

13. The method of claim 9, wherein the forming of a rigid pattern by hardening the first pattern is performed by at least any one of ultraviolet treatment, heat treatment, laser radiation, and chemical treatment.

14. The method of claim 9, wherein the forming of a rigid pattern by hardening the first pattern is performed with changing the property of the surface of the flexible substrate.

15. The method of claim 9, wherein the printing is performed by any one of transfer printing, inkjet printing, and roll-to-roll printing.

16. The method of claim 9, wherein the forming of a rigid pattern by hardening the first pattern is performed such that the rigid pattern is larger at least in hardness than the conductive flexible pattern.

17. A motion sensing device comprising:
a strain sensor including:
a flexible substrate;
a rigid pattern on one side of the flexible substrate; and
a conductive flexible pattern extending in a first direction on the one side of the flexible substrate,
wherein the conductive flexible pattern is configured to overlap the rigid pattern such that as the flexible substrate is compressed or stretched, the conductive flexible pattern is compressed or stretched, thereby changing electrical resistance,
wherein the flexible pattern is configured to form a crack thereon at a portion adjacent to the rigid pattern when the flexible pattern is stretched such that the electrical resistance of the conductive flexible pattern is changed by the crack formed on the flexible pattern,
a signal source applying an electrical stimulus to the strain sensor; and
a lead-out circuit performing processing in response to an electrical signal according to a change in electrical resistance of the strain sensor.

18. The motion sensing device of claim 17, the motion sensing device is disposed on the skin of a joint, on a band or a glove covering a joint, and in a joint.

* * * * *